T. W. VARLEY.
ELECTRICAL MEASURING INSTRUMENT.
APPLICATION FILED OCT. 10, 1907.
1,132,890.
Patented Mar. 23, 1915.
5 SHEETS—SHEET 2.
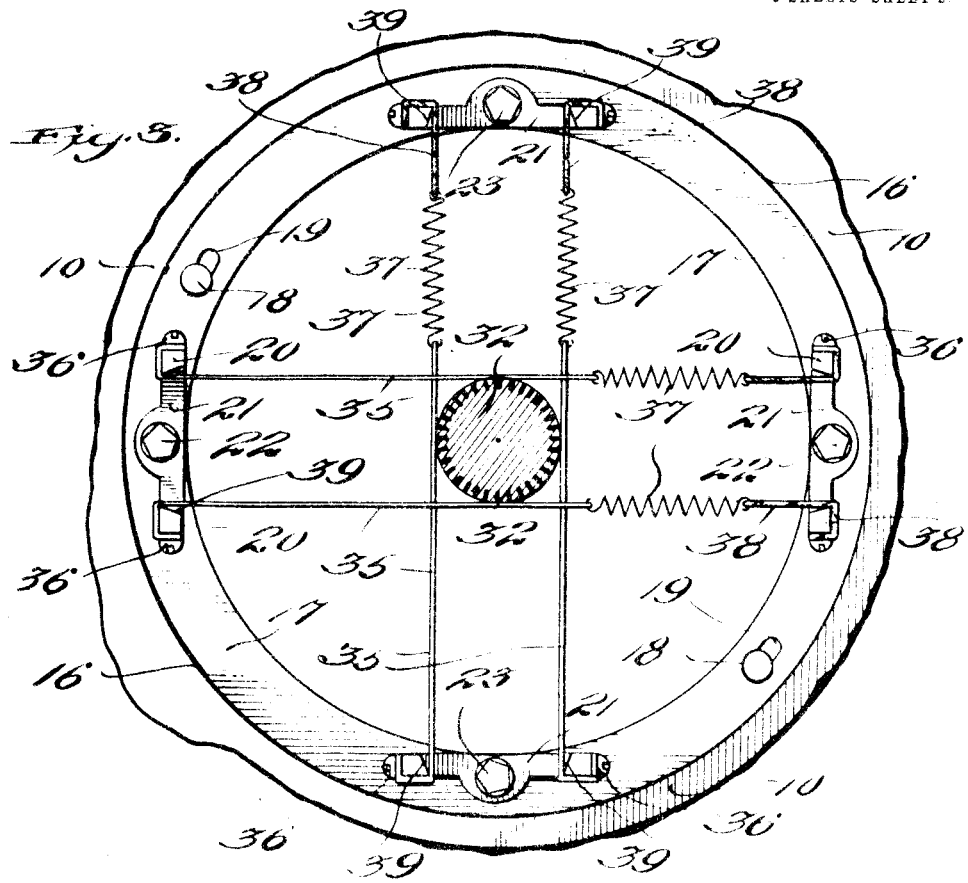
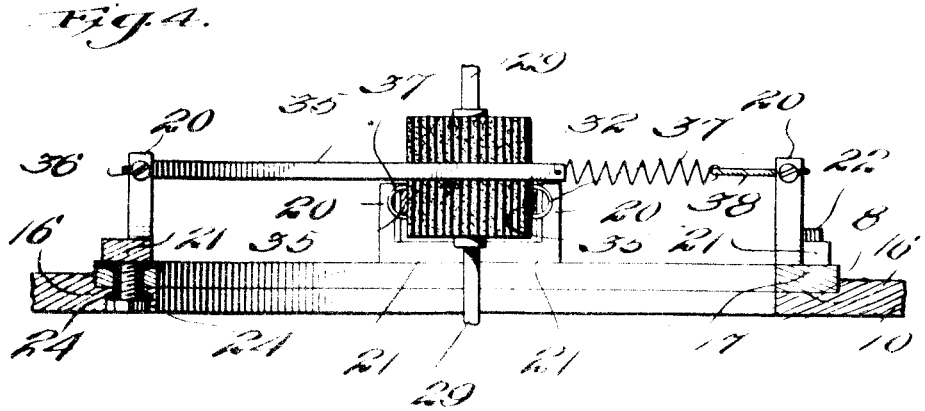

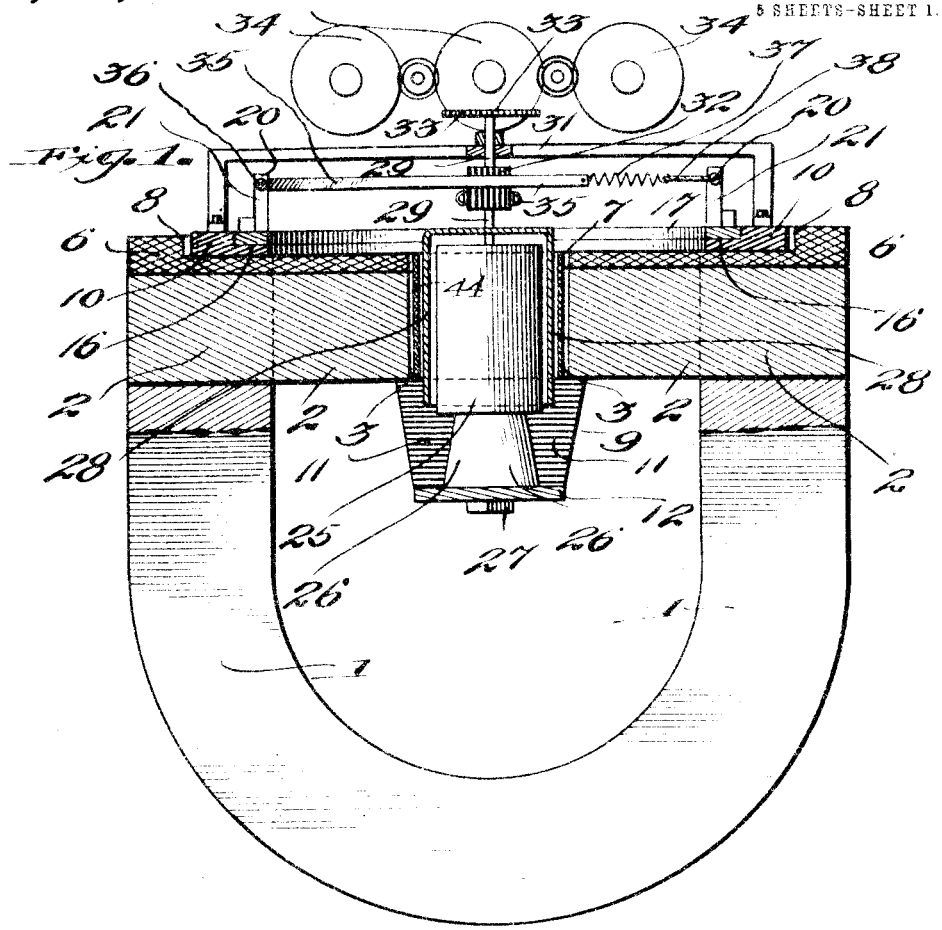

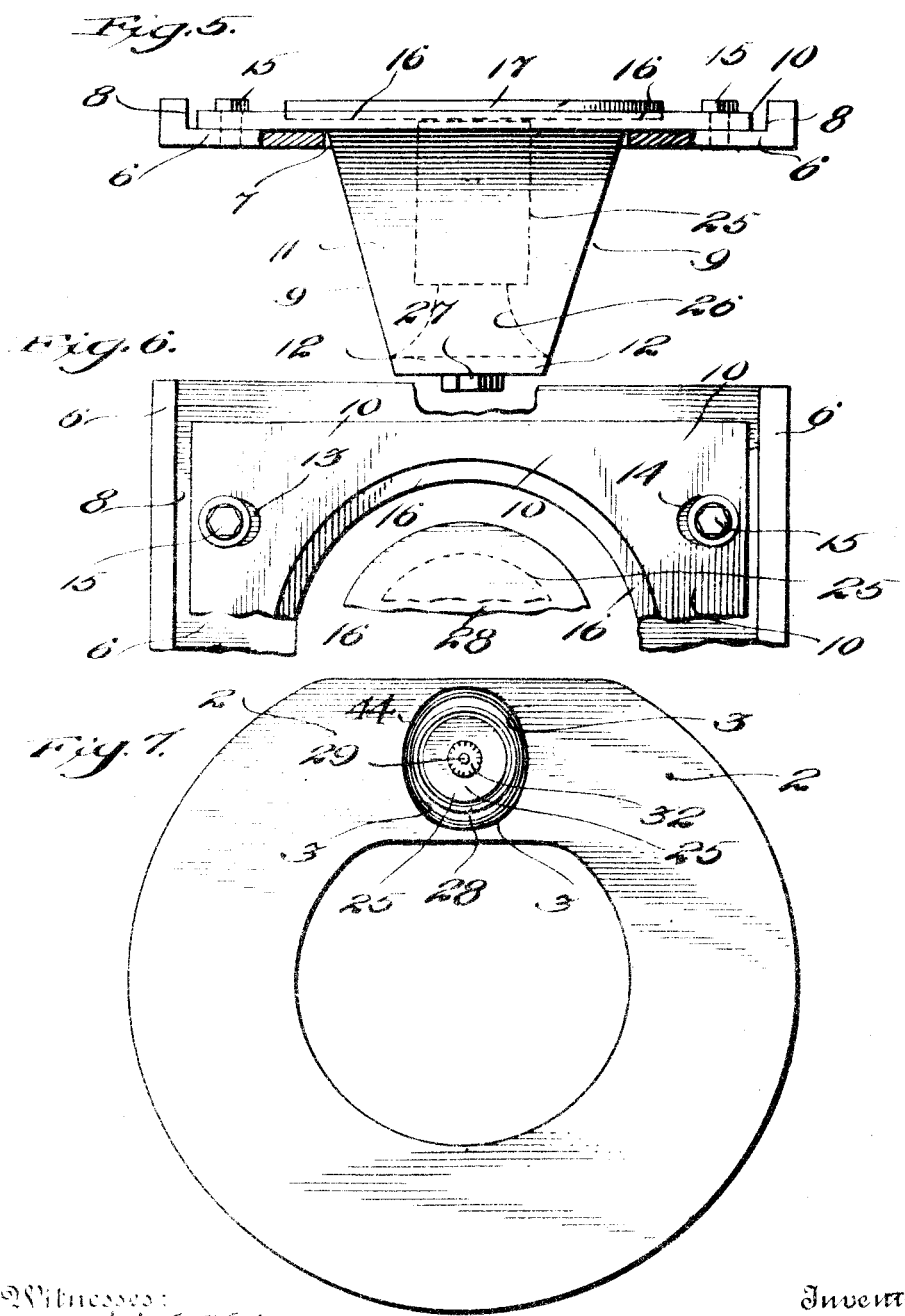

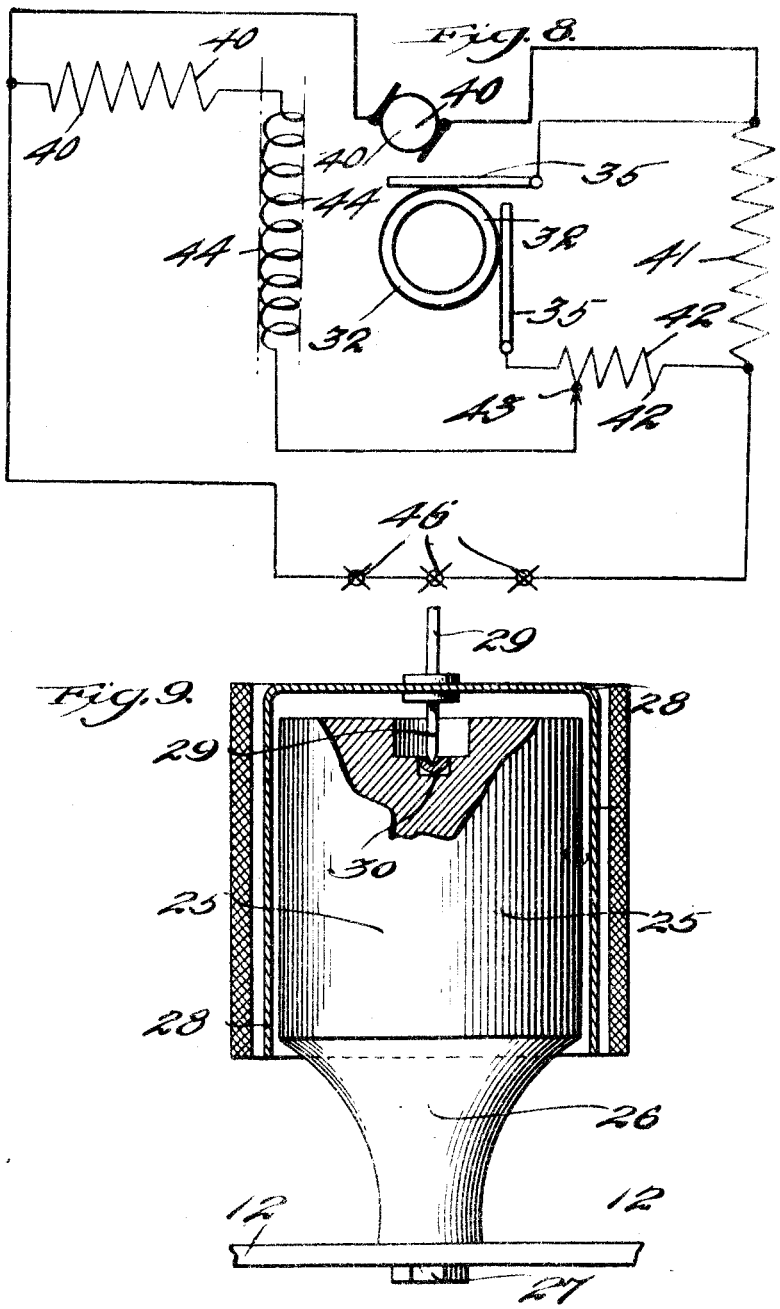

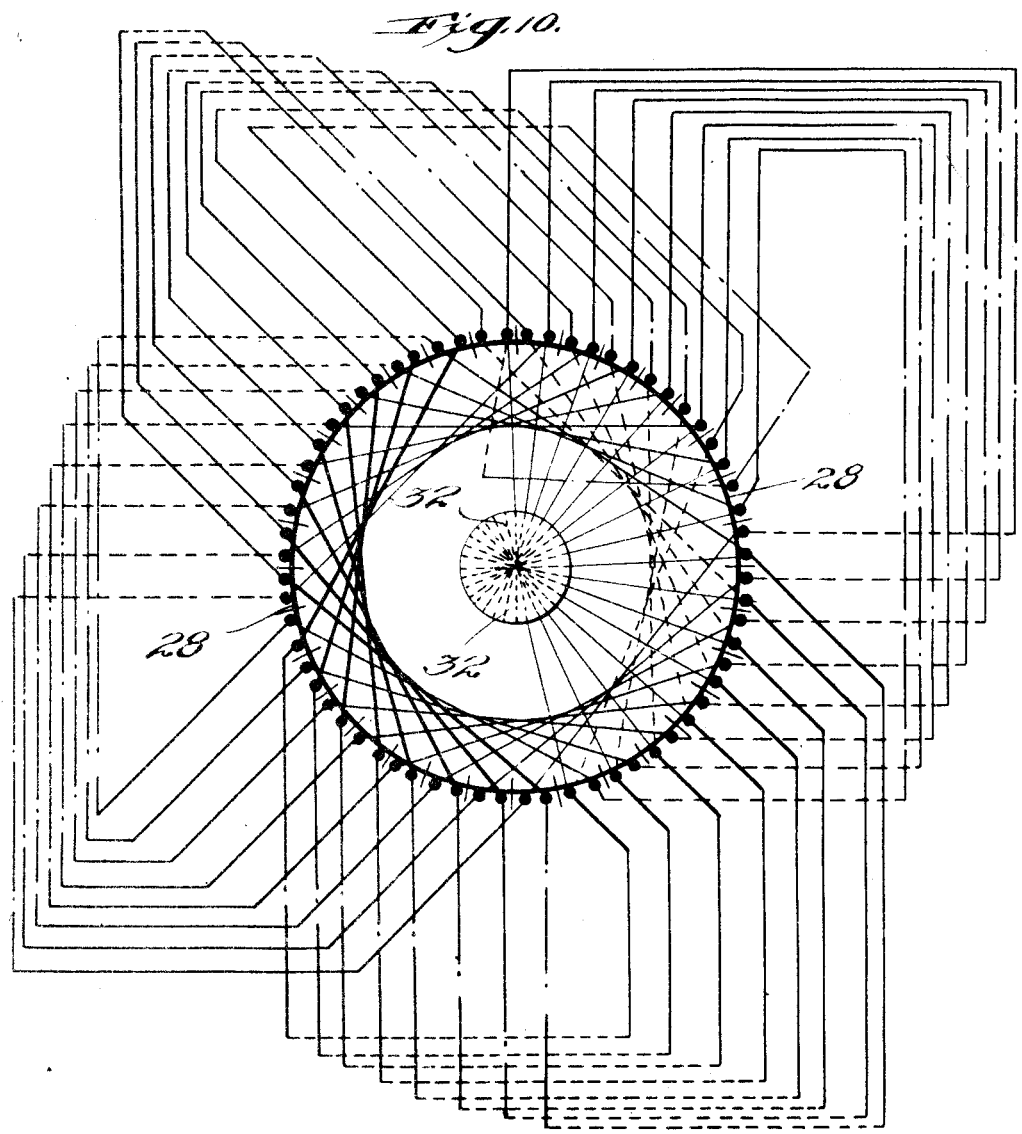

UNITED STATES PATENT OFFICE.

THOMAS W. VARLEY, OF NEW YORK, N. Y., ASSIGNOR TO WESTINGHOUSE ELECTRIC & MANUFACTURING COMPANY, A CORPORATION OF PENNSYLVANIA.

ELECTRICAL MEASURING INSTRUMENT.

1,132,890.      Specification of Letters Patent.      Patented Mar. 23, 1915.

Application filed October 10, 1907. Serial No. 396,867.

*To all whom it may concern;*

Be it known that I, THOMAS W. VARLEY, a citizen of the United States, residing at New York city, in the county of New York and State of New York, have invented certain new and useful Improvements in Electrical Measuring Instruments, of which the following is a specification.

My invention relates to improvements in electrical measuring instruments of that class wherein advantage is taken of a substantially constant magnetic field, caused by either an electro-magnet or a permanent magnet as preferred, in combination with stationary and movable coils so disposed that a current passing through the stationary coil will shift or distort the lines of force of the constant magnetic field in such manner as to cause a torque on the movable coil, the function of the stationary coil being simply to shift the lines of force in the constant magnetic field and not necessarily to create the magnetic field itself, as in the ordinary electric dynamometer.

I will hereinafter describe, in connection with the accompanying drawings, a structure embodying my improvements, the features thereof being more particularly pointed out hereinafter in the claims.

In the drawings Figure 1 is a side elevation, partly in section of a structure designed to be used as an integrating watt meter. Fig. 2 is a top plan view of one form of magnet. Fig. 3 is a plan view, on an enlarged scale, and partly in section, of the parts shown in Fig. 4. Fig. 4 is a side elevation, partly in section, showing the details of the scheme of commutator brushes on an enlarged scale. Fig. 5 is a side elevation of one form of core support. Fig. 6 is a plan view, partly broken away, showing one means of adjusting the position of the core support. Fig. 7 is a plan view of a modification showing the use of an annular magnet without pole pieces, parts being removed. Fig. 8 is a diagrammatic view of the connections. Fig. 9 is an elevation, on an enlarged scale, and partly in section and partly broken away, showing a detail of the cup support. Fig. 10 is a diagrammatic view showing the windings of the movable coil and the commutator connections.

Similar numerals of reference indicate similar parts throughout the several views.

1 represents a substantially constant magnet, here shown in the form of a permanent horse shoe magnet. 2 represents a pole piece provided with a central aperture 3, preferably in the form of an ellipse. The magnet 1 may be provided with upwardly projecting teeth or shoulders 4 over which slots 5 in pole piece 2 are adapted to fit in order to provide a good magnetic connection. If desired, magnet 1 may be made of a plurality of magnets or laminæ placed side by side (not shown).

6 represents a substantially rectangular plate of any suitable material, such as brass, adapted to be fastened to pole piece 2 to form a support for other parts. Plate 6 is cut away centrally as at 7 and is provided with a shoulder 8 extending along each end of the plate. A box or core support 9, comprising a top plate 10, centrally apertured to register with opening 7 in plate 6, side members 11, 11 and bottom plate 12 is adapted to be adjustably secured on plate 6. Top plate 10 is provided with openings 13 and 14 to permit of adjustment of position and is adapted to be clamped to plate 6 by set screws 15. Top plate 10 is further provided with a circumferential groove 16. Side members 11, 11 extend downwardly from top plate 9 on each side of pole piece 2. A ring 17 is adapted to be adjustably secured in groove 16 by means of set screws 18, ring 17 being slotted as at 19 to permit of said adjustment. Standards or brush supports 20 forming parts of brackets 21 are adapted to be clamped to ring 17 by screws 22 and 23. One screw of each pair, as 23, is preferably insulated from ring 17 by an insulating bushing 24. Core 25, preferably of laminated soft iron plates, is suitably supported on and fastened to a support 26, preferably of non-magnetic material, support 26 being in turn held to bottom plate 12 of box or core support 9 by a screw 27. A cup 28, preferably of aluminum, is supported from a shaft 29 having one bearing on a jewel 30 in core 25 and another in bracket 31 supported on box or core support 9, the lower bearing of the shaft 29 being above the center of gravity of the moving element, thus giving stability to the armature and lessening the side thrust of shaft 29 on the top bearing in bracket 31. Shaft 29 also carries a commutator cylinder 32 and a gear wheel 33 adapted to mesh with a suitable gear wheel (not shown) for driving the registering mechanism 34. Brushes 35 are supported by standards 20, one end of each brush being clamped to one of the standards 20 by a screw 36 and the other being attached to a spring 37 fastened to another of the standards 20 by a thread 38. Standards 20 are cut away on their inner sides at 39 to give a finer adjustment to the brushes.

As shown in Fig. 8, 40 is a source of electrical energy, here shown as a direct current generator. 41 is a resistor representing the load shunt. 42 is an adjustable resistor, adapted to adjust the load current through the armature and, in conjunction with the moving contact 43, to vary the amount of potential current passing through the armature to compensate for initial friction of moving parts. 44 represents the stationary or field coil wound to form a four pole field corresponding to the armature winding. Coil 44 is supported in any convenient way on the inside face of aperture 3 coaxially with the armature winding, or it may be mounted on the box or core support 9, as desired, and is preferably in the form of a distributed winding. 45 is an adjustable resistor in the potential circuit. 46 represents the load.

The armature winding is placed on the cup 28 and is shown diagrammatically in Fig. 10 in connection with the commutator. As illustrated, the armature winding is adapted to form a four pole, two circuit winding, utilizing an even number of commutator bars and armature coils. In the ordinary form of four pole, two circuit winding, all the commutator bars are connected successively to the armature coils and, where the pairs of poles are even in number, an odd number of coils and bars are used. In the armature winding shown in Fig. 10, one half of the commutator connections are omitted, as shown, the commutator bars being diametrically cross connected instead, thus enabling the armature to be wound with an even number of coils and bars. Otherwise the armature winding is well known and does not need further description to those skilled in the art.

In Fig. 3 four brushes are shown, opposite brushes being electrically connected and considered as one, which arrangement is shown diagrammatically in Fig. 8.

In the operation of the device, the movable coil or armature is in a balanced condition with respect to the magnetic field but becomes unbalanced when current traverses the stationary coil, this unbalancing being a function of the current in the stationary coil, the torque on the moving coil varying as the product of the current in the moving coil and the current in the stationary coil, the current in the moving coil varying as the current to the load and the current through the stationary coil varying as the potential of the load. It is obvious that the functions of the coils may be transposed. The resultant retardation of the armature caused by induced currents set up in the cup as it rotates is unaffected by changes in current strength in either the moving or stationary coil, thus rendering the retardation or drag a function of the speed only, hence making the instrument an integrating watt meter.

By providing a single pole piece having a central aperture for the armature and core a magnetic field is formed which is easily shifted and which, in value and time, follows more exactly the changes of the current strength in the fixed coil, no breaks being made in the sides, the thickness of the sides being adjusted as desired. The magnetic field is also less affected by external influences. The aperture in the pole piece is preferably made not a true circle to permit of adjustment, for example, for finding the magnetic center for the moving coil or armature.

Mounting the core, armature and other parts, on a single support enables the whole to be adjusted as one with reference to the magnetic center without altering their relative positions. Making the brushes adjustable circumferentially enables the proper commutation point to be found.

Each brush is preferably made of a flexible flat strip of silver, flat side to the commutator, fastened at one end in any suitable manner so as to make electrical contact and at the other end by a spring and thread, one brush standard of each pair being insulated to form the electrical connection to the load shunt, as illustrated herein. The spring puts the proper tension on the brush and the thread prevents the spring from twisting the flat strip under varying tension of the spring. This construction permits the use of a light and flexible brush with low inertia, insures a fixed point of contact on the commutator, allows the brush freedom to follow the surface of the commutator and reduces the liability of the brush to leave the commutator because of commutator inequalities or because of jarring. Good contact under light tension is assured.

Fig. 7 shows a modified form of field magnet, made either solid or laminated and without a separate pole piece.

The stationary coil 44 is preferably made of copper wire while the resistor 45 is preferably made of some material, such as manganin, having a negligible temperature coefficient. The current strength of the field circuit will vary with temperature changes. The moving coil or armature winding is preferably of copper and the resistor 42 is preferably of manganin and thus the current strength of the armature circuit will vary with temperature changes. The cup 28 being of aluminum, the currents set up in the cup will also vary with temperature changes. By a proper proportioning of the amount of copper and manganin used in the coils and resistor specified, the resultant effect of temperature changes can be made substantially zero, thus rendering the instrument independent of temperature changes. For example, the resistance of the stationary coil may be made thirty per cent. of the field circuit resistor and the resistor of the resistance 46, seventy per cent. thereof, while the resistance of the moving coil may be made seventy per cent. of the armature circuit resistance and the resistance of resistance 42 thirty per cent. thereof.

Let K represent the temperature coefficient of copper. Then, with a given rise of temperature, the current in the field circuit will change as $$\frac{1}{1+.3K(t_1-t_0)},$$

and the current in the armature circuit will change as $$\frac{1}{1+.7K(t_1-t_0)},$$

while the currents set up in the cup will change as $$\frac{1}{1+K(t_1-t_0)}.$$

The torque causing rotation will, therefore, change as $$\frac{1}{1+.3K(t_1-t_0)} \times \frac{1}{1+.7K(t_1-t_0)} = \frac{1}{1+K(t_1-t_0)+.21K^2(t_1-t_0)^2}.$$

Since K is small, being .004 per degree centigrade rise in temperature, $.21K^2(t_1-t_2)^2$ is inappreciable and substantially negligible. Therefore, the torque producing rotation is $$\frac{1}{1+K(t_1-t_0)},$$

or substantially the same as the torque producing retardation. In other words, as the torque falls with rise in temperature so will the drag, each counteracting the other, the speed of rotation remaining constant for varying temperatures, other conditions not being changed.

I do not restrict myself to any of the details of structure or arrangement of parts shown and described as it is obvious that they may be varied without departing from the spirit of the invention.

While the invention is illustrated as applied to an integrating watt meter it is clear that it may be adapted to use in connection with indicating watt meters as well as with volt meters and ammeters and with either direct or alternating currents.

What I claim and desire to secure by Letters Patent is:

1. An electrical measuring instrument comprising relatively movable coils, and resistors having resistance-temperature coefficients different from those of the coils, the ratios of the resistances of the coils to those of the resistors respectively in circuit therewith being in substantially inverse relation to each other.

2. An electrical measuring instrument comprising a substantially constant magnet having an elliptical aperture between its poles, a rotatable armature located in said aperture and having a commutator cylinder, and a support that is adjustable with respect to the magnet and carries the said armature.

3. An electrical measuring instrument comprising a substantially constant magnet having an elliptical aperture between its poles, a rotatable armature located in said aperture, a support that is adjustable with respect to the magnet and carries the said armature, brushes bearing upon the commutator cylinder, and a support therefor that is carried by the aforesaid support and is adjustable with respect thereto.

4. An electrical measuring instrument comprising a substantially constant magnet having an elliptical aperture between its poles, a core located in said aperture, a rotatable armature surrounding said core and having a commutator cylinder, a support that is adjustable with respect to the magnet and carries the said core and armature, brushes bearing on the commutator cylinder, and a support for the brushes that is carried by and is adjustable with respect to the aforesaid support.

5. An electrical measuring instrument comprising a magnet having an unbroken magnetic circuit and an elliptical aperture between its poles, a core located in said aperture, a movable coil surrounding said core, and a support that is adjustable with respect to the magnet and carries the core and coil.

6. An electrical measuring instrument comprising relatively movable coils, resistors respectively in circuit therewith, a conducting member driven by the relative movement of the said coils, and a magnet adjacent to the conducting member, the coils and conducting member being composed of materials having similar resistance-temperature coefficients, and the resistors being composed of materials having resistance-temperature coefficients differing therefrom, and the ratios of the resistances of the coils to those of the resistors respectively in circuit therewith being in substantially inverse relation to each other.

7. An electrical measuring instrument comprising relatively movable coils, resistors respectively in circuit therewith, a conducting member driven by the relative movement of the said coils, and a magnet adjacent to the conducting member, the coils and conducting member being composed of materials having similar resistance-temperature coefficients, and the resistors being composed of materials having resistance-temperature coefficients differing therefrom, and the ratios of the resistances of the coils to those of the resistors respectively in circuit therewith being such that that the forward and retarding torques of the instrument vary substantially proportionately with changes of temperature.

8. An electrical measuring instrument comprising relatively movable coils, resistors respectively in circuit therewith, a conducting member driven by the relative movement of the coils, and a magnet adjacent to the movable member, the said coils and movable member having appreciable resistance-temperature coefficients, and the resistors having substantially negligible resistance-temperature coefficients, and the ratios of the resistances of the coils to those of the resistors respectively in circuit therewith being in substantially inverse relation to each other.

9. An electrical measuring instrument comprising relatively movable coils, resistors respectively in circuit therewith, a conducting member driven by the relative movement of the coils, and a magnet adjacent to the movable member, the said coils and movable member having appreciable resistance-temperature coefficients, and the resistors having substantially negligible resistance-temperature coefficients, and the ratios of the resistances of the coils to those of the resistors respectively in circuit therewith being such that the forward and retarding torques of the instrument vary substantially proportionately with changes of temperature.

10. An electrical measuring instrument comprising relatively movable coils, and resistors respectively in circuit therewith, the ratios of the resistance of the coils to those of the resistors respectively in circuit therewith being in substantially inverse relation to each other.

11. An electrical measuring instrument comprising a magnet having a substantially elliptical opening between its poles, a core, a movable coil surrounding said core, said core and coil being located in the opening in the magnet, and means for adjusting said core and coil transversely of said opening and in the direction of its longer axis.

12. An electrical measuring instrument comprising a magnet having a substantially elliptical opening between its poles, a core, a movable coil surrounding said core, said core and coil being located in the opening in the magnet, and means for adjusting said core and coil transversely of said opening.

13. An electrical measuring instrument comprising relatively movable coils, resistors respectively in circuit therewith, a conducting member driven by the relative movement of the coils, and a magnet adjacent to the conducting member, the coils and conducting member having different resistance-temperature coefficients from the resistors, and the ratios of the resistances of the coils to those of the resistors respectively in circuit therewith being in substantially inverse relation to each other.

14. An electrical measuring instrument comprising relatively movable coils, resistors respectively in circuit therewith, a conducting member driven by the relative movement of the coils, and a magnet adjacent to the conducting member, the coils and conducting member having different resistance-temperature coefficients from the resistors, and the ratios of the resistances of the coils to those of the resistors respectively in circuit therewith being such that the forward and retarding torques of the instruments vary substantially proportionately with changes in temperature.

15. An electrical measuring instrument comprising relatively movable coils and resistors respectively in circuit therewith having substantially negligible resistance-temperature coefficients, the ratios of the resistances of the coils to those of the resistors respectively in circuit therewith being in substantially inverse relation to each other.

In testimony whereof I have hereunto signed my name in the presence of two subscribing witnesses.

THOMAS W. VARLEY.

Witnesses:
 ROBERT W. ASHLEY,
 CLARENCE S. ASHLEY.

It is hereby certified that in Letters Patent No. 1,132,890, granted March 23, 1915, upon the application of Thomas W. Varley, of New York, N. Y., for an improvement in "Electrical Measuring Instruments," errors appear in the printed specification requiring correction as follows: Page 3, line 11, for the word "resistor," both occurrences, read *resistance;* same page, line 12, for the word "resistance" read *resistor;* same page, line 16, for the syllables "sistance" read *sistor;* page 4, line 49, for the word "resistance" read *resistances;* and that the said Letters Patent should be read with these corrections therein that the same may conform to the record of the case in the Patent Office.

Signed and sealed this 1st day of June, A. D., 1915.

[SEAL.]

J. T. NEWTON,
*Acting Commissioner of Patents.*